United States Patent Office 3,803,225
Patented Apr. 9, 1974

3,803,225
1-HALOPHOSPHOLENES
Curtis P. Smith, Cheshire, and Henri Ulrich, North Branford, Conn., assignors to The Upjohn Company, Kalamazoo, Mich.
No Drawing. Filed June 1, 1971, Ser. No. 149,001
Int. Cl. C07f 9/52
U.S. Cl. 260—543 P                 5 Claims

ABSTRACT OF THE DISCLOSURE

Compounds are disclosed having the general formula:

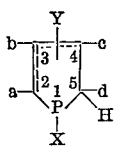

wherein $a$, $b$, $c$ and $d$ are each selected from the group consisting of hydrogen, halogen, alkoxy of 1 to 6 carbons, phenoxy, hydrocarbyl, and halogen substituted hydrocarbyl; provided at least one of $a$, $b$, $c$ and $d$ is a substituent other than hydrogen; X represents chlorine, bromine and iodine; the broken line represents a double bond located between the carbon at position 3 and one of the carbons at positions 2 and 4; and Y is hydrogen attached to whichever carbon atom at position 2 or 4 is not part of the double bond. The novel compounds are intermediates for preparing a wide variety of compounds, useful, for example, as insecticides, bacteriostatic agents, flame retardant components for polymer systems, selective solvents and catalysts for preparing carbodiimides from isocyanates.

BACKGROUND OF THE INVENTION

(1) Field of the invention

The invention relates to novel heterocyclic phosphorus compounds and is more particularly concerned with novel 1-halophospholenes and with methods for their preparation.

(2) Description of the prior art

Prior hereto, trivalent phospholenes and phospholanes were described (U.S. Pat. 2,853,518; Quin et al., J. Org. Chem., vol. 33, pp. 1034–41, March 1968) wherein the acyclic moiety on the phosphorus atom is alkyl or aryl. These 1-alkyl- and 1-aryl-trivalent phospholenes and phospholanes are difficult to handle, being immediately oxidized to the corresponding pentavalent oxides upon exposure to air, 1-hydrophospholene and 1-hydrophospholane compounds were also known prior hereto (German Pat. 1,223,838). However, these latter compounds are unstable, and pyrophoric upon exposure to air.

The preparation of 1-halophosphetans has also been described; D. J. H. Smith et al., J. Chem. Soc. (D), 1969, p. 855.

A number of aliphatic organic trivalent halophosphorus compounds have also been described prior hereto. For example the dialkylhalophosphines as represented by diethylphosphorus chloride (Komkov et al., Zhur. Obschchei Khim., vol. 28, pp. 2963–5, 1958).

Subsequent to our invention, as described hereinafter, the preparation of 1-bromo-3-phospholene was described in a communication by Quin et al., appearing in J. Am. Chem. Soc., 92, 5779 (1970).

Also subsequent to our invention, the synthesis of 1-halophospholenes was described by Myers et al., J. Org. Chem., vol. 36, No. 9, pp. 1285–90.

SUMMARY OF THE INVENTION

The invention comprises 1-halophospholenes of the formula:

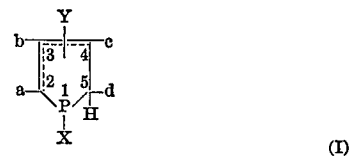

(I)

wherein $a$, $b$, $c$ and $d$ are each selected from the group consisting of hydrogen, halogen, alkoxy of 1 to 6 carbon atoms, inclusive, phenoxy, hydrocarbyl and halogen-substituted hydrocarbyl, said hydrocarbyl in each instance having 1 to 6 carbon atoms, inclusive; provided that at least one of $a$, $b$, $c$ and $d$ is a substituent other than hydrogen; X is selected from the group consisting of chlorine, bromine and iodine; the broken line represents a double bond located between the carbon at position 3 and one of the two carbons at positions 2 and 4; Y is hydrogen and is attached to whichever carbon atom at positions 2 and 4 is not part of said double bond. The invention also comprises methods of preparing and using the novel compounds of Formula I.

One skilled in the art will appreciate that the compounds of Formula I can also exist in both cis and trans stereoisomer forms. It is to be understood therefore, that the Formula I encompasses not only the structural isomers, but the cis and trans stereo-isomeric forms of each structural isomer and mixtures of such cis and trans forms.

The term "halogen" is used throughout this specification and claims in its generally accepted sense as embracing chlorine, bromine, iodine and fluorine.

The term "hydrocarbyl" as used throughout the specification and claims means the monovalent radical obtained by removing one hydrogen atom from the parent hydrocarbon, which latter contains 1 to 6 carbon atoms. Illustrative of such hydrocarbyl groups are alkyl of 1 to 6 carbon atoms, inclusive, such as methyl, ethyl, propyl, butyl, pentyl, and hexyl including isomeric forms thereof; alkenyl of 2 to 6 carbon atoms, inclusive, such as vinyl, allyl, butenyl, pentenyl, and hexenyl including isomeric forms thereof; and phenyl;

The term "halogen substituted hydrocarbyl" means those hydrocarbyl groups as before defined wherein from one to all of the hydrogen atoms have been replaced by halogen as defined above. Illustrative of halogen substituted hydrocarbyl are chloromethyl, trichloromethyl, 2-chloroethyl, 2-bromoethyl, 1-chlorobutyl, 2-bromohexyl, 2-chlorobutenyl, 1,1,1 - trifluorohexenyl p-chlorophenyl, 2,5-diiodophenyl and the like.

The term "alkoxy of 1 to 6 carbon atoms, inclusive" means the monovalent radical of formula —O—E wherein E is alkyl of 1 to 6 carbon atoms, inclusive, as defined above. Illustrative of alkoxy of 1 to 6 carbon atoms, inclusive, are methoxy, ethoxy, propoxy, butoxy, pentyloxy, hexyloxy, and isomeric forms thereof.

Compounds of the Formula I are useful intermediates in a variety of syntheses. For example, they may be used to prepare insecticides,, bacteriostatic agents, catalysts for the preparation of carbodiimides, selective solvents and fire retardant components of polymer systems. Methods of preparing useful compounds from the novel compounds of the inveniton will be discussed in more detail hereinafter.

DETAILED DESCRIPTION OF THE INVENTION

The system of nomenclature followed in this specification and the claims is illustrated by the following examples:

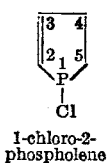
1-chloro-2-phospholene

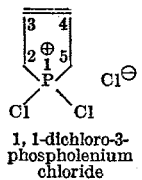
1,1-dichloro-3-phospholenium chloride

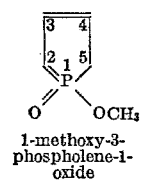
1-methoxy-3-phospholene-1-oxide

The Formula I represents two structural isomers which comprise the novel compounds of the invention. One isomeric form has the double bond in the 2-position, and hereinafter is referred to as 2-phospholene. The other structural isomer has the double bond in the 3-position and hereinafter is referred to as a 3-phospholene. As will be discussed hereinafter, both isomers are obtained in admixture when certain methods of preparation are employed. Both isomers are useful and for many purposes may be used in admixture. When desired however, they are readily separated by conventional methods such as fractional distillation, countercurrent extraction, chromatographic separation and like methods.

The novel Compounds I can be prepared by a variety of methods. For example, one can use the method disclosed in our copending application, Ser. No. 148,999, filed June 1, 1971. In general, the method comprises reacting the corresponding 1,1-dihalophospholenium halide (II) with an organic phosphine compound. Using triphenylphosphine as an example of an organic phosphine compound, the reaction can be illustrated schematically by the equation:

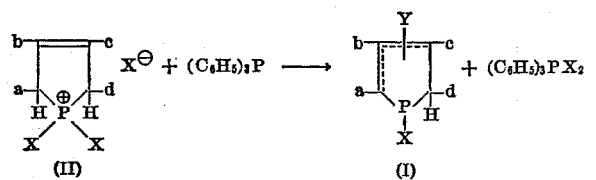

wherein $a$, $b$, $c$, $d$, X and Y have the significance hereinbefore assigned them.

The reaction is carried out by admixing approximately equimolar proportions of the reactant (II) and the organic phosphine in the presence of an inert organic solvent. An inert organic solvent is one which does not enter into or in any way interfere with the desired course of the reaction, such as for example, benzene, toluene, xylene, methylene chloride, chloroform, carbon tetrachloride, 1,2-dichloroethane and the like.

The course of the reaction can be monitored by infrared spectral analysis, vapor phase chromatography, nuclear magnetic resonance analysis and like techniques. The latter method, for example will indicate that reaction has occurred by the appearance of absorption spectra characteristic of the Compound I. Upon completion of the reaction, the novel compounds of Formula I are separated from the reaction mixture by conventional techniques such as distillation, countercurrent extraction and like techniques. A mixture of both structural isomers, i.e. the 2-phospholene and the 3-phospholene, is generally obtained by the above described process. The relative proportion of each isomer obtained will vary from trace amounts to nearly 100% of the isomeric mixture. The relative proportions of each isomer obtained appears to be dependent upon the nature of the substituents $a$, $b$, $c$, $d$ and X as previously defined.

In the described process, the starting phospholenium halide compounds of Formula II are 1:1 adducts obtained by the Diels-Alder reaction of a conjugated diene of formula:

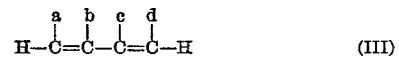

wherein $a$, $b$, $c$ and $d$ have the significance hereinbefore assigned to them, with the appropriate phosphorus trihalide (IV) selected from the group consisting of phosphorus trichloride, phosphorus tribromide and phosphorus triiodide. The procedure for preparing the Compounds II by reaction of Compounds III and IV is detailed in Hasserodt et al., Tetrahedron, vol. 19, pp. 1563–75 (1963).

Organic phosphine compounds used in preparing the novel Compounds I by the above described method are derivatives of phosphine, in which one, two or three of the hydrogen atoms have been replaced by alkyl, aryl or aralkyl groups. The organic phosphines are well known compounds, as is their preparation; see, for example, the text Organophosphorus Compounds, Kosolapoff, John Wiley & Sons Inc., New York, N.Y., 1950, chapter 2, pp. 10–41. Representative of organic phosphine compounds are methylphosphine, phenylphosphine, dioctylphosphine, dibenzylphosphine, tributylphosphine, triphenylphosphine, diethylphenylphosphine, triphenethylphosphine, and the like.

The starting compounds of Formula II can also be reduced with formic acid to obtain the novel Compounds I. By this method, equimolar proportions of the Compounds II and formic acid are admixed and stirred. Gaseous by-products are immediately evolved upon admixture. An indication that the reaction is complete is the cessation of gaseous by-product evolution, whereupon the Compounds I are separated from the reaction mixture by conventional techniques such as distillation. Preferably, the reduction with formic acid is carried out in the presence of an inert organic solvent, as previously defined. The preferred solvent is benzene and it is preferably employed in a quantity sufficient to provide a slurry of Compound II in the initial reaction mixture.

An alternative method of preparing the novel Compounds I is by reacting a conjugated diene of Formula III, with a phosphorus trihalide (IV) and white phosphorus. Alternatively, an organic phosphine compound as previously defined may be substituted for the white phosphorus reactant.

The latter methods of preparing the novel Compounds I may be represented schematically by the equation:

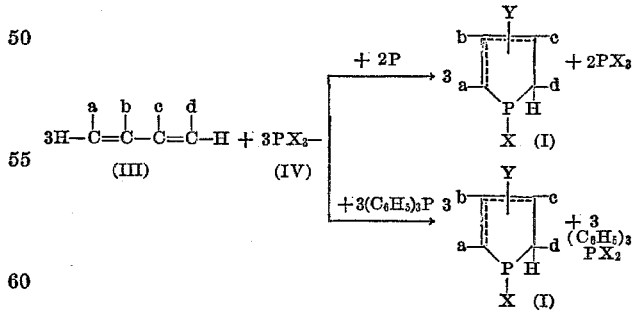

wherein $a$, $b$, $c$, $d$, X and Y have the significance hereinbefore assigned to them, and triphenylphosphine is used to illustrate an organic phosphine compound. According to the alternate methods of preparation, the reaction is carried out in an inert organic solvent as defined above, and in the presence of a compound which will prevent polymerization of the diene (III). Compounds which will inhibit polymerization of the diene (II) are well known; see for example, U.S. Pats. 2,663,736; 2,663,737 and Belgian Pat. 631,416 which list a number of compounds known to inhibit the polymerization of conjugated dienes. Examples of such inhibitor compounds are copper stearate, trinitrobenzene, trinitrotoluene and the like.

The reaction of the diene (III) and phosphorus trihalide (IV) in the presence of phosphorus or a phosphine is assisted by heating the reaction mixture, preferably from about 40° C. to reflux temperature, and also by adding catalytic proportions of iodine to the reaction mixture. A less preferred catalyst is phosphorus tribromide, which may be employed when the phosphorus trihalide reactant (IV) is phosphorus trichloride.

In the course of the reactions comprising the alternative processes for preparing the Compounds I as illustrated by the equation immediately above, the 3-phospholene isomer of Formula I is the initial product obtained. By controlling the process conditions, i.e. by not allowing the reaction mixture to be heated in excess of about 40° C. for a period in excess of about 3 hours, it is possible to prepare the 3-phospholene isomer of Formula I substantially free of the 2-phospholene isomer. When the process conditions are such that the reaction mixture is heated between about 40° C. to reflux temperature for a period in excess of about 3 to 10 hours, the product will generally comprise a mixture of both 3-phospholene and 2-phospholene structural isomers of the Formula I. The proportion of each structural isomer obtained in the reaction mixture under the above conditions appears to be dependent upon the nature of the substituents $a$, $b$, $c$, $d$ and $X$ as before defined, as well as upon the process temperature conditions.

The course of the reactions comprising the alternative methods of preparing the Compounds I may be followed by conventional analytical techniques such as infra-red spectral analysis, nuclear magnetic resonance analysis and like methods. The desired Compounds I are conveniently separated from the reaction mixture by conventional methods such as distillation, countercurrent extraction and like methods.

The alternative methods for preparing compounds of Formula I from the diene (III) as described above are more fully described in our copending applications Ser. Nos. 148,997 and 148,996, filed June 1, 1971, and now U.S. Pats. 3,723,520 and 3,737,456, respectively.

The conjugated dienes (III) which are starting compounds in the above described alternative methods for preparing Compounds I and for preparing the phospholenium halides (II) are, for the most part, well known compounds as is their preparation. For example, those compounds of Formula III wherein $a$, $b$, $c$ or $d$ are hydrogen, phenyl, alkyl of 1 to 6 carbons, or alkenyl of 1 to 6 carbons, may be prepared by the catalytic dehydrogenation of the appropriate olefines (see Egloff et al., Chem. Reviews, vol. 35, p. 279, 1944). Other methods are discussed in E. H. Rodd, Elsevier Publishing Co., New York, N.Y. (1951), vol. II, pp. 267–9. The method of Makin et al., Zhur Obschchei Khim., vol. 30, pp. 3276–80 (1960) is an example of a procedure by which the Compounds III can be prepared wherein $a$, $b$, $c$ or $d$ are alkoxy of 1 to 6 carbon atoms, inclusive.

The halogenated compounds of Formula III can be prepared by substitution halogenation of the corresponding non-halogenated compound using conventional and known methods; see for example E. H. Rodd, supra, pp. 274–84.

The 2-phospholene isomers of Formula I can also be prepared by catalytic rearrangement of the corresponding 3-phospholene isomer. The rearrangement is carried out by admixing the 3-phospholene compound with a catalyst in an inert organic solvent. Although the isomerization reaction can be carried out at temperatures of from about 25° C. to reflux temperature, the rate of rearrangement is advantageously increased by heating the rearrangement mixture to a temperature between about 40° C. to reflux temperature.

The catalyst employed in the isomerization process of the invention can be phosphorus pentachloride or a phospholenium halide of Formula II such as for example 1,1-dichloro-3-methyl-3-phospholenium chloride, 1,1-dibromo-3-methyl-3-phospholenium bromide, 1,1-dichloro-3,4-dimethyl-3-phospholenium chloride and the like.

In the above rearrangement the catalyst is employed in a catalytic proportion, which is generally from about 0.001 molar percent to 10.0 molar percent based on the starting 3-phospholene.

The inert organic solvent employed in the above described rearrangement is an inert organic solvent as previously defined. The preferred solvent is benzene. The solvent is employed in sufficient quantity to provide a concentration of 3-phospholene in the initial reaction mixture of about 0.1 molar to about 10.0 molar.

When the rearrangement process is carried out under the preferred temperature conditions; i.e. 40° C. to reflux temperature, rearrangement of a proportion of the 3-phospholene to the corresponding 2-phospholene isomer generally occurs within 30 minutes. The rearrangement is observable by conventional analytical techniques such as nuclear magnetic resonance analysis.

Upon completion of the rearrangement, the desired 2-phospholene isomer is separated from the reaction mixture by conventional techniques, such as for example, fractional distillation, countercurrent extraction and the like.

The following examples describe the manner and process of making and using the invention, and set forth the best mode contemplated by the inventors of carrying out the invention but are not to be construed as limiting.

EXAMPLE 1

Preparation of 1-chloro-3-methyl-3-phospholene

A 12 liter, 3 necked round bottom flask fitted with a stirrer is charged with 5200 ml. of benzene and 1 lb. of white phosphorus. The air in the reaction flask is replaced with nitrogen gas, and the mixture distilled at reflux temperature to remove water, and about 200 ml. of benzene. While maintaining the nitrogen gas atmosphere, the reaction flask is additionally charged with 44.5 gms. of copper stearate, 2782 ml. (27.82 moles) of isoprene; 1847 ml. (2907 gms.; 21.2 moles) of phosphorus trichloride, 105 ml. (299.5 gms.) of phosphorus tribromide and 11 gms. of iodine. The mixture is refluxed for about 5 hours under the nitrogen gas atmosphere while being continually stirred. At the end of this period, the reaction mixture is distilled at a pressure of between 100 mm. and 760 mm. of Hg and at a temperature circa 40° C. to remove solvent and other volatile materials. The residue comprises a clear yellow solution and an orange precipitate. The solution is decanted and distilled at a temperature of 20° to 30° C. under a pressure of 30 mm. to 70 mm. of mercury to remove any remaining volatiles. Continued distillation at a temperature of 50° C. to 68° C. and under a pressure of 8.0 to 9.0 mm. of mercury gives 1414 gms. of 1-chloro-3-methyl-3-phospholene in the form of a colorless liquid having a boiling point of 54° C./8.0 mm. of Hg. The assigned structure of the product is confirmed by nuclear magnetic resonance analysis. The orange precipitate obtained as described above during the course of the reaction is washed with benzene, and the washing combined with benzene solvent previously stripped from the reaction mixture, as described above. Upon distillation of the combined benzene extracts an additional 90 gms. of 1-chloro-3-methyl-3-phospholene product is obtained, to total a net yield of 1504 gms. (50% of theory).

Similarly, following the above procedure, but replacing the isoprene as used therein with an equal molar proportion of the following conjugated dienes:

2-chloro-;
2,3-dichloro-;
1,2,3-trichloro-;
1,2,3,4-tetrabromo-;
1,2-dibromo-;
1,2,3-trifluoro-;

2-chloro-1-iodo;
2-ethyl-;
2-ethyl-3-methyl-;
2-propyl-;
2,3-dibutyl-;
2-pentyl-;
2-chloromethyl-;
2-(4-chloro-4-methylpentyl)-;
2-phenyl-;
1,2,4-triphenyl-;
1-o-chlorophenyl-4-phenyl-;
1-p-bromophenyl-4-phenyl-;
2-chloro-1-(p-chlorophenyl)-;
1,2-diphenyl-4-methyl-;
1,4-diethyl-;
1-(2,2-dibromoethyl)-;
1-vinyl-;
1-(2-chlorovinyl)-;
1-phenoxy-;
3-(4-methyl-3-pentenyl)-;
2-methoxy-;
2,3-dimethoxy-;
2-butoxy-;
4-isopentyloxy-; and
2-isohexyloxy-1,3-butadiene (the last compound being prepared by pyrolysis of the corresponding acetal of vinylacetaldehyde prepared by reacting isohexyl vinyl ether with acetone, mercuric acetate and boron trifluoride etherate, according to the method of Makin et al., supra), there are obtained:

1,3-dichloro-;
1,3,4-trichloro-;
1,2,3,4-tetrachloro-;
1-chloro-2,3,4,5-tetrabromo-;
1-chloro-2,3-dibromo-;
1-chloro-2,3,4-trifluoro-;
1,3-dichloro-2-iodo-;
1-chloro-3-ethyl-;
1-chloro-3-ethyl-4-methyl-;
1-chloro-3-propyl-;
1-chloro-3,4-dibutyl-;
1-chloro-3-pentyl-;
1-chloro-3-chloromethyl-;
1-chloro-3-(4-chloro-4-methylpentyl)-;
1-chloro-3-phenyl-;
1-chloro-2,3,5-triphenyl-;
1-chloro-2-o-chlorophenyl-5-phenyl-;
1-chloro-2-p-bromophenyl-5-phenyl-;
1,3-dichloro-2-(p-chlorophenyl)-;
1-chloro-2,3-diphenyl-5-methyl-;
1-chloro-2,5-diethyl-;
a mixture of 1-chloro-2-(1,2-dibromoethyl)- and 1-chloro-5-(1,2-dibromoethyl)-;
a mixture of 1-chloro-2-vinyl- and 1-chloro-5-vinyl-;
a mixture of 1-chloro-5-(2-chlorovinyl)- and 1-chloro-2-)-2-chlorovinyl)-;
a mixture of 1-chloro-2-phenoxy- and 1-chloro-5-phenoxy-;
1-chloro-4-(4-methyl-3-pentenyl)-;
1-chloro-3-methoxy-;
1-chloro-3,4-dimethoxy-;
1-chloro-3-butoxy-;
a mixture of 1-chloro-5-isopentyloxy- and 1-chloro-2-isopentyloxy-; and
a mixture of 1-chloro-5-isohexyloxy- and 1-chloro-2-isohexyloxy-3-phospholene, respectively.

EXAMPLE 2

Preparation of 1-chloro-3,4-dimethyl-3-phospholene

A round bottom flask is charged with 100 ml. of benzene, 35.22 gms. (0.2565 mole) of phosphorus trichloride, 28.75 gms. (0.35 mole) of 2,3-dimethyl-1,3-butadiene, 0.25 gm. of copper stearate, 5.3 gms. (0.171 mole) of white phosphorus (freshly washed with acetone and then benzene) and 0.2 gm. of iodine. While being continually stirred, the mixture is refluxed for 2 hours and then stripped of solvent and other volatiles by distillation at a temperature of circa 70° C. to 80° C. The residue is distilled at a temperature of 63° C. to 65° C. under a pressure of 7.0 mm. of mercury to give 24.8 gms. (65.2% theory) of 1-chloro-3,4-dimethyl-3-phospholene in the form of a colorless liquid. Redistillation gives a colorless liquid which is pure 1-chloro-3,4-dimethyl-3-phospholene having a boiling point of 59° C. to 60° C./7.0 mm. of mercury.

*Analysis.*—Calcd. for $C_6H_{10}ClP$ (percent): C, 48.4; H, 6.70; P, 20.80. Found (percent): C, 48.5; H, 6.82; P, 20.78.

The assigned structure of the product is confirmed by proton nuclear magnetic resonance analysis.

EXAMPLE 3

Preparation of 1-bromo-3-methyl-2-phospholene and 1-bromo-3-methyl-3-phospholene To a slurry of 62.3 gms. (0.184 mole) of 1,1-dibromo-3-methyl-3-phospholenium bromide (Hasserodt et al., supra) and 150 ml. of dichloromethane there is added with stirring 48.21 gms. (0.184 mole) of triphenylphosphine in 50 ml. of dichloromethane. An additional 50 ml. of dichloromethane is then added. The slurry is immediately transformed to a clear, red-brown solution. After about 30 minutes, the reaction mixture is seeded with solid obtained by treating an aliquot of the reaction mixture with excess benzene. A cream colored precipitate immediately forms. The reaction mixture is filtered under a blanket of nitrogen gas. The filtrate is warmed (circa 40° C.) under a water vacuum to evaporate solvent and other volatiles, leaving a gummy residue. To the residue there is added sufficient dichloromethane to dissolve the gum, and then there is added 200 ml. of benzene. The resulting mixture is filtered and the filtrate is distilled under a pressure of 8.0 mm. of Hg and at a temperature of 68° C. to 72.5° C. to give 13.3 gms. (41% of theory) of a mixture of 1-bromo-2-methyl-2-phospholene and 1-bromo-3-methyl-3-phospholene. The assigned structure of the products is confirmed by nuclear magnetic resonance analysis. Integration of the proton nuclear magnetic resonance spectra of the product mixture shows the relative proportions of the isomers to be 27% of the 2-phospholene and 73% of the 3-phospholene isomer.

The two isomers are separated by fractional distillation.

Similarly, following the above procedure but replacing the 1,1-dibromo-3-methyl-3-phospholenium bromide as used therein with an equal molar proportion of 1,1-diiodo-3-methyl-3-phospholenium iodide (prepared by reacting isoprene with phosphorus triiodide following the procedure of Hasserodt et al., supra) there is obtained a mixture of 1-iodo-3-methyl-2-phospholene and 1-iodo-3-methyl-3-phospholene.

EXAMPLE 4

Preparation of 1-chloro-3-methyl-2-phospholene

To a slurry of 87.3 gms. (0.425 mole) of 1,1-dichloro-3-methyl-3-phospholenium chloride (Hasserodt et al., supra) and 75 ml. of benzene there is added with stirring 105 gms. (0.40 mole) of triphenylphosphine in 75 ml. of benzene. Immediately upon admixture, a clear solution is formed, followed by precipitation of a cream colored material. Precipitation ceases in about 10 minutes. The supernatant liquid is decanted and the residue triturated three times with 100 ml. of benzene. After each trituration, the triturate is decanted and combined with the first supernatant decanted. The combined supernatant and triturates are distilled under a pressure of 14 mm. to 15 mm. of mercury and at a temperature of 72° C. to 74° C. to give 13.8 gms. (24.1% theory) of 1-chloro-3-methyl-2-phospholene in the form of a colorless liquid. Redistillation gives purified 1-chloro-3-methyl-2-phospholene having a boiling point of 64° C. to 65° C/9.0 mm. of mercury. The assigned structure of the product is confirmed by proton nuclear magnetic resonance analysis.

*Analysis.*—Calcd. for $C_5H_8ClP$ (percent): C, 44.61; H, 5.95; P, 23.05. Found (percent): C, 44.60; H, 6.00; P, 23.00.

EXAMPLE 5

Preparation of 1-chloro-3-methyl-2-phospholene by isomerization of the 3-isomer

To 5.0 ml. (5.6 gms.; 0.0416 mole) of 1-chloro-3-methyl-3-phospholene (prepared according to the procedure of Example 1), there is added 2.0 gms. (0.0096 mole) of phosphorus pentachloride in 25 ml. of benzene. The mixture is refluxed for 15 minutes, and then cooled to room temperature. Following reflux, the reaction mixture comprises a clear solution and a reddish-black, gum-like precipitate. After cooling the solution is decanted from the reaction mixture, stripped of solvent and distilled at a temperature of 65° C. to 67° C. under a pressure of 11 mm. of mercury to give 1.7 gms. of a clear distillate which is found by proton nuclear magnetic resonance analysis to be 66% by weight (1.13 gms.; 20.1% of theory) of 1-chloro-3-methyl-2-phospholene, and 34% by weight of 1-chloro-3-methyl-3-phospholene. The desired 1-chloro-3-methyl-2-phospholene is separated from the reaction mixture by fractional distillation.

Similarly, following the above procedure, but replacing the 1-chloro-3-methyl-3-phospholene as used therein, by any of the other 3-phospholene compounds shown in Examples 1, 2 and 3 there is obtained the corresponding 2-phospholene.

EXAMPLE 6

To 3.42 gms. (0.0254 mole) of 1-chloro-3-methyl-3-phospholene (prepared by the method of Example 1) there is added 10 ml. of benzene previously dried over Linde Type 4A molecular sieves and 0.4 gm. (0.00194 mole) of 1,1-dichloro-3-methyl-3-phospholenium chloride (Hasserodt et al., supra). The mixture is refluxed for 15 minutes, and then cooled to room temperature. The reaction mixture is stripped of solvent and other volatiles, and the residue distilled under a pressure of 8.0 mm. of mercury at a temperature of 52° C. to 55° C. to give 2.13 gms. of a mixture of 1-chloro-3-methyl-3-phospholene and 1-chloro-3-methyl-2-phospholene. Nuclear magnetic resonance analysis indicates the proportion of each isomer to be 72% by weight (1.53 gms.) of the 2-phospholene and 28% by weight (0.60 gm.) of the 3-phospholene.

EXAMPLE 7

Preparation of 1-chloro-3,4-dimethyl-2-phospholene and 1-chloro-3,4-dimethyl-3-phospholene A round bottom flask is charged with 43.5 gm. (0.198 mole) of 1,1-dichloro - 3,4 - dimethyl-3-phospholenium chloride (Hasserodt et al., supra) and 51.9 gms. (0.198 mole) of triphenylphosphine. The flask is then additionally charged with 50 ml. of dichloromethane and the mixture stirred. There is immediately obtained a clear, brown solution. After stirring for about 30 minutes, the reaction mixture is distilled at a temperature of 68° C. to 72° C. and under a pressure of 14 mm. of mercury to give 12.7 gms. (43.2% of theory) of a colorless distillate which is a mixture of 1-chloro-3,4-dimethyl-2-phospholene and 1-chloro-3,4-dimethyl-3-phospholene.

Nuclear magnetic resonance analysis confirms the structures assigned to the products and shows the relative proportion of each isomer in the product mixture to be 71% of the 2-phospholene, and 29% of the 3-phospholene isomer.

The two isomers are separated by fractional distillation.

EXAMPLE 8

Preparation of 1-chloro-3-phospholene

A reaction flask is charged with 200 ml. of chloroform, 24.8 gms. (0.46 mole) of 1,3-butadiene, 42.1 gms. (0.306 mole) of phosphorus trichloride, 0.5 gm. of copper stearate and 78.6 gms. (0.3 mole) of triphenylphosphine. The mixture is stirred and then allowed to stand at room temperature for a prolonged period. At the end of this period, the reaction mixture is filtered, and the filtrate distilled under a reduced pressure of 10 mm. of mercury, and that fraction which distills at a temperature of 41° C. is collected. There is thus obtained 1.82 gms. of 1-chloro-3-phospholene, in the form of a colorless liquid having a boiling point of 41° C./10 mm. of Hg. The assigned structure of the product is confirmed by nuclear magnetic resonance analysis.

The 1-chloro-3-phospholene so obtained is a valuable intermediate compound, useful in preparing, for example 1-ethoxy-3-phospholene-1-oxide. The preparation is carried out by reacting the 1-chloro-3-phospholene with ethanol in the presence of air and a tertiary amine acid acceptor (method of Hasserodt et al., supra). The 1-ethoxy-3-phospholene-1-oxide is a useful selective solvent (U.S. Pat. 3,345,287) and a useful catalyst for the conversion of isocyanates to carbodiimides (A. E. Arbuzov et al., Doklady Akademii Nauk SSSR, vol. 170, No. 3, pp. 585–588, September 1966).

The novel Compounds I of the invention are useful intermediates in a variety of syntheses. Illustratively, following the procedure of Hasserodt et al., supra for preparing phospholene-1-oxides, the novel Compounds I can be reacted with aliphatic alcohols such as methanol, ethanol, propanol, butanol, isoamyl alcohol and the like, or with phenol. The reaction is carried out in the presence of air and a tertiary amine acid acceptor such as a trialkylamine to give the corresponding 1-alkoxy- or 1-phenoxy-phospholene-1-oxide. The 1-alkoxy- and 1-phenoxy-phospholene-1-oxides so prepared are useful selective solvents in the extraction of aromatics (see U.S. Pat. 3,345,287) and are useful as bacteriostatic agents (see Vizel et al., Dokl. Akad. Nauk SSSR, vol. 160 (4), pp. 826–8 (1965)).

The 1-alkoxy- and 1-phenoxy-phospholene-1-oxides are also useful catalysts for the preparation of carbodiimides from isocyanates (see Arbuzov et al., supra).

The 1-alkoxy-3-phospholene-1-oxides, specifically, are known to possess insecticidal activity (see U.S. Pat. 2,663,737).

The novel Compounds I are also intermediates for the preparation of a variety of novel compounds, which are useful intermediates, for example, in the preparation of novel compounds useful as reactive flame retardants in polymer systems. Illustratively, the Compounds I can be reacted with an aliphatic alcohol such as methanol, ethanol, propanol and the like in the same manner as described for preparing 1-alkoxy-phospholene-1-oxides (Hasserodt et al., supra) except that air is excluded from the reaction mixture. There is then obtained the corresponding trivalent 1-alkoxy-phospholene compound.

The 1-alkoxy-phospholene compounds so prepared undergo the well-known Mannich reaction (see Organic Reactions, vol. 1, pp. 303–330) with formaldehyde and an alkanolamine illustrated by those of formula:

(V)

wherein F is selected from the group consisting of hydrogen, alkyl of 1 to 12 carbon atoms, inclusive and hydroxyalkyl of 1 to 12 carbon atoms, inclusive; G is hydroxyalkyl of 1 to 12 carbon atoms, inclusive.

The term "alkyl of 1 to 12 carbon atoms, inclusive" means the monovalent moiety obtained by removal of a hydrogen atom from an alkane of the stated carbon content. Representative of alkyl of 1 to 12 carbon atoms, are methyl, ethyl, propyl, butyl, pentyl, hexyl, heptyl, octyl, nonyl, decyl, undecyl, dodecyl and isomeric forms thereof.

The term "hydroxyalkyl of 1 to 12 carbon atoms, inclusive" means alkyl of 1 to 12 carbon atoms, inclusive as defined above, wherein one hydrogen atom has been replaced with a hydroxy group.

The product of the Mannich reaction carried out as described above is the corresponding 1-alkanolaminomethylphospholene-1-oxide. The latter compounds are novel phosphorus containing compounds, illustrated by compounds of the formula:

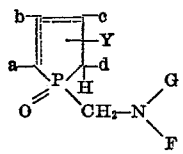

(VI)

wherein $a$, $b$, $c$, $d$, Y, F, G, and the broken line have the significance hereinbefore assigned to them. The compounds of the Formula VI contain functional hydroxyl groups and are particularly useful in preparing fire retardant polyurethane polymers by any of the known methods; see for example, Dombrow, "Polyurethanes," Reinhold Publishing Co., New York, pp. 1–105 (1957); Saunders et al., "Polyurethanes," part I, Interscience Pub. New York, 1962.

The Compounds I can also be employed in the preparation of a novel class of phosphorus containing polyols having the formula:

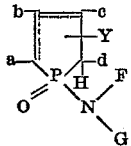

(VII)

wherein $a$, $b$, $c$, $d$, Y, F, G and the broken line have the significance hereinbefore assigned to them. The preparation of Compounds VII is carried out by reacting substantially equimolar proportions of Compounds I with alkanolamines as illustrated by the Formula V in the presence of air. The Compounds VII contain functional hydroxyl groups, and are useful for preparing fire retardant polyurethane polymers in the same manner as the Compounds VI (see Dombrow, supra; Saunders et al. supra).

What is claimed is:
1. 1-chloro-3-methyl-3-phospholene.
2. 1-chloro-3,4-dimethyl-3-phospholene.
3. 1-bromo-3-methyl-3-phospholene.
4. 1-chloro-3-methyl-2-phospholene.
5. 1-chloro-3,4-dimethyl-2-phospholene.

References Cited

FOREIGN PATENTS 1,011,974  12/1965  United Kingdom __ 260—543 P
  210,155   6/1968  U.S.S.R. _____ 260—543 P

OTHER REFERENCES

Quinn et al.: VACS, 191:12, June 1969, pp. 3308–14.
Coggon et al.: VACS, 192:19, September 1970, pp. 5779–80.

LORRAINE A. WEINBERGER, Primary Examiner
R. D. KELLY, Assistant Examiner

U.S. Cl. X.R.

260—45.9 R, 551 P, 583 E, 606.5 P, 973

UNITED STATES PATENT OFFICE
CERTIFICATE OF CORRECTION

Patent No. 3,803,225   Dated April 9, 1974

Inventor(s) Curtis P. Smith and Henri Ulrich

It is certified that error appears in the above-identified patent and that said Letters Patent are hereby corrected as shown below:

Column 3, lines 5 - 10:                    Should read:

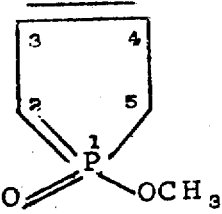                       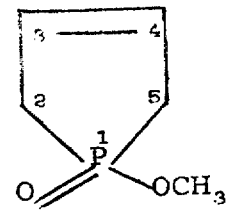

Column 3, line 62:                         Should read:

Compound I                                 Compounds I

Column 7, line 16:                         Should read:

1-(2,2-dibromoethyl)-;                     1-(1,2-dibromoethyl)-;

Column 7, line 25:                         Should read:

2-isohexyloxy-                             4-isohexyloxy-

Column 8, line 43:                         Should read:

1-bromo-2-methyl                           1-bromo-3-methyl-

References cited - Missing:

Kosolapoff - Organophosphorus
  Compounds, pp. 51-53 (1950)

Column 10, line 24: Quinn et al. VACS      Should read: Quinn et al. JACS

Column 10, line 25: Coggon et al. VACS     Should read: Coggon et al JACS

Signed and sealed this 8th day of October 1974.

(SEAL)
Attest:

McCOY M. GIBSON JR.                        C. MARSHALL DANN
Attesting Officer                          Commissioner of Patents